United States Patent [19]

Kuwabara et al.

[11] Patent Number: 5,632,042
[45] Date of Patent: May 20, 1997

[54] DATA FLOW PROCESSOR AND DATA FLOW PROCESS CHANGING SYSTEM

[75] Inventors: Tatsuyuki Kuwabara; Masaharu Tomita; Kiyotaka Nagamura; Takao Nakamura, all of Mitaki; Shin'ichi Yoshida, Osaka; Souichi Miyata, Osaka; Tsuyoshi Muramatsu, Osaka, all of Japan

[73] Assignees: Japan Radio Co. Ltd., Tokyo; Sharp Corporation, Osaka, both of Japan

[21] Appl. No.: 97,195

[22] Filed: Jul. 26, 1993

[30] Foreign Application Priority Data

Jul. 28, 1992 [JP] Japan .................................. 4-201115
Dec. 28, 1992 [JP] Japan .................................. 4-348490

[51] Int. Cl.$^6$ ................................................ G06F 9/38
[52] U.S. Cl. ........................................ 395/800; 395/377
[58] Field of Search ................................ 395/650, 377, 395/376, 800, 775; 364/232.22

[56] References Cited

U.S. PATENT DOCUMENTS

| | | | |
|---|---|---|---|
| 4,412,285 | 10/1983 | Neches et al. | 364/200 |
| 4,630,196 | 12/1986 | Bednar, Jr. et al. | 364/200 |
| 5,060,150 | 10/1991 | Simor | 364/200 |
| 5,093,919 | 3/1992 | Yoshida et al. | 395/800 |
| 5,125,097 | 6/1992 | Okamoto et al. | 395/800 |
| 5,212,792 | 5/1993 | Gerety et al. | 395/650 |
| 5,218,706 | 6/1993 | Komori et al. | 395/775 |

*Primary Examiner*—Kevin A. Kriess
*Assistant Examiner*—Michael T. Richey
*Attorney, Agent, or Firm*—Loeb & Loeb LLP

[57] ABSTRACT

The present invention relates to a data flow process changing system for relieving the process executed in a data flow processor and further for changing the constant in the process of the data flow processor. The data flow process changing system includes a counter section for counting the number of input data, a destination number selecting section for selecting a destination number corresponding to the counted number of input data and a tagging section for forming a packet. When a destination number corresponding to the counted number of input data is selected in the data flow process changing system, the program executed in the data flow processor can be changed. In the data flow process changing system, a constant change data generating section is responsive to a constant change request to generate a constant change data, and a destination number selecting and tagging section forms a packet addressing the destination number of a constant change program. When the packet is provided to the data flow processor, the constant change program updates the constant of the constant table store, in which the constant used in the main program has been stored, to a predetermined constant.

7 Claims, 7 Drawing Sheets

DATA FLOW PROCESSOR AND DATA FLOW PROCESS CHANGING SYSTEM

BACKGROUND OF THE INVENTION

1. Field of the Invention

The present invention relates to a data flow process changing system particularly capable of relieving the process in a data flow processor and moreover to such a data flow process changing system which can change the constant in the data flow processor.

2. Description of the Related Art

When a data flow processor sequentially receives packets, the data flow processor executes its internally stored program. If a packet contains an operation command (addition, multiplication or the like), that packet is temporarily retained until another packet arithmetically corresponding to the first packet is read into the data flow processor. The operation can only be performed by the data flow processor when these packets make a pair.

The flow of data in the prior art process made by such a data flow processor will be described below.

FIG. 2 shows the functional arrangement of the data flow processor and FIG. 3 shows a packet 20 processed by the data flow processor.

As shown in FIG. 2, the data flow processor 10 comprises an input/output control section 11, a program storage section 12 in which a program executed by the data flow processor 10 has been stored, a queue section 13 functioning as an area in which when operation commands are provided by a pair of packets, the first read packet is temporarily retained until the corresponding packet is read into the data flow processor, and a processing section 14. As shown in FIG. 6, the data flow processor 10 may be connected to a data storage section 15 which receives the output of the queue section 13 and then provides its own output to the input/output control section 11. As shown in FIG. 8, the data storage section 15 comprises a constant table and data area 15a, 15b which have stored therein constants and data used in the process of the main program.

The data flow processor 10 responds to a destination number 23 and command 24 contained in the packet 20 to execute a program stored in the program storage section 12. The destination number 23 contains a number corresponding to an address in a program to be executed. Since one data flow processor 10 normally performs a single process, the destination number 23 in the inputted packet may be designated by any invariable number (e.g. zero).

The data flow processor 10 performs the process when it receives input data rows ①, ②, ③ . . . as shown in FIG. 4. The input data 21 is first provided to a tagging section 40 which in turn tags the input data 21 to form a packet 20. The tag 22 contains the destination number 23, the command 24 and generation identification data representing the generation of the input data 21.

The packet 20 prepared by the tagging section 40 is supplied to the input/output control section 11 of the data flow processor 10 before it is provided to the program storage section 12 wherein a command 24 to be next executed and a destination number 23 are given to the packet 20. If the command 24 contained in the packet 20 is an operation command shared by another packet 20, the first packet 20 waits for the other packet 20 in the queue section 13. When the other packet 20 which is the arithmetic companion to the first packet 20 is taken into the data flow processor, these two packets 20 make a pair which in turn is sent to the processing section 14 for executing the command. If the command 24 in the first packet 20 is not an operation command shared by the other packet 20, the first packet 20 passes by the queue section 13 and is provided directly to the processing section 14 wherein the command 24 thereof is executed. The packet 20 is updated by the result from the processing section 14. The updated packet 20 is then sent to the input/output control section 11 wherein it is outputted therefrom in accordance with the destination number 23 written by the program storage section 12 or again supplied to the program storage section 12 for re-operation.

In such a manner, the data flow processor 10 can execute a particular processing program.

The data flow processor 10 may change the process depending on the range of input data rows in the following manner:

FIG. 4 shows the relationship between the range of input data rows and the process. In such an example, the data flow processor 10 performs a process 1 to the first to fifth input data rows and a process 2 to the sixth to tenth input data rows. Similarly, the data flow processor 10 performs the process 1 to the eleventh to fifteenth input data rows and the process 2 to the sixteenth to twentieth input data rows. In such a manner, the processes 1 and 2 will be repeated over all the range of five successive input data rows.

In order to change the process in the data flow processor 10, the prior art counts the number of packets 20 inputted into the data flow processor 10 through the tagging section 40 and determines what range the counts is included in. Thus, the process 1 or 2 is executed. Since the prior art does not have any device for setting different destination numbers 23, the packet 20 is prepared with the same destination number to all the input data.

In other words, the process to be executed by the data flow processor 10 is modified so that the process 1 is executed if the counted number of packets 20 is within the range of one through five; the process 2 is executed if the counted number of packets 20 ranges between six and ten; the process 1 is executed if the counted number of packets 20 ranges between eleven and fifteen and so on. Each of the different processes is executed by switching the program to another program corresponding to that process.

Thus, the prior art has a problem in that the time required to execute the operation is prolonged since the number of packets inputted into the data flow processor is counted with the counted value being used to change the process.

SUMMARY OF THE INVENTION

To overcome the above problem in the prior art, an object of the present invention is to provide a data flow process changing system which can change the process executed in a data flow processor without operation by the data flow processor.

To this end, the present invention provides a data flow process changing system which comprises a counter means for counting a series of input data sequentially supplied to a data flow processor, a destination number selecting means for selecting a destination number corresponding to the number of input data counted by the counter section from a table in which destination numbers have been stored, and a tagging means for applying a tag including said destination number to said input data to form a packet to be supplied to the data flow processor.

The data flow process changing system of the present invention is characterized by that the destination number is selected depending on the counted number of input data to change the process executed by the data flow processor.

In the data flow process changing system of the present invention, the destination number selecting means selects a destination number for a process corresponding to the number of input data. The tagging means prepares a packet by applying a tag containing the destination number to the input data. Thus, the data flow processor may execute a process corresponding to the destination number which is written in a packet from the data flow process changing system. Therefore, the process to be executed by the data flow processor can be changed without the need for counting the number of packets inputted into the data flow processor.

Although the aforementioned data flow process changing system of the present invention can change the process executed by the data flow processor or the program executed by the program storage section, it does not have a function of providing or changing a constant used in the program.

When a main program is read out in the prior art, its internal constant is also read out. The constant cooperates with a constant from a data storage area to perform a given processing operation. If it is desired to change the constant used in the processing operation, the main program is temporarily discontinued. A program for changing the constant is executed to change the value of a table in which the constant is stored. Thereafter, the main program is restarted.

Such an operation also requires a prolonged time to perform the processing.

Another object of the present invention is to change the constant used in the main program without discontinuation.

In order to accomplish this second object, a system of the present invention for changing the constant of the processing operation in a data flow processor requires a data flow processor and a data flow process changing system which will be described below.

First of all, the present invention provides a data flow processor having a program storage section containing a plurality of programs for executing various processes and adapted to respond to a destination number to select a program to be executed, the program storage section being connected to a data storage section having a constant table in which constants used in the main programs stored in the program storage section have been stored, the data flow processor being such that a process is performed by executing one of the main programs, characterized by that the program storage section includes a constant changing program responsive to a command for updating the constant stored in the constant table.

The present invention also provides a data flow process changing system comprises means for generating a constant change data used to change the constant of the process in the above data flow processor, means for selecting a destination number corresponding to a series of input data to be sequentially supplied to the data flow processor or said constant change data, tagging means for applying a tag containing said destination number to said input data or constant change data to form a packet to be sent to the data flow processor, whereby when said packet is received by said data flow processor, a program corresponding to said destination number contained in said packet can be executed by the data flow processor and the data flow processor can receive a command for updating the constant from the fact that said packet contains the constant change data.

In the system for changing the constant in the process of the data flow processor by providing a packet containing the constant change data prepared by the data flow process changing system to the data flow processor data, the constant change program may have a predetermined constant change value and respond to a packet command containing said constant change data to update the constant stored in said constant table to said constant change value.

In the system for changing the constant in the process of the data flow processor by providing a packet containing the constant change data prepared by the data flow process changing system to the data flow processor data, the constant change data may contain a constant to be updated and the constant change program may respond to a packet command containing said constant change data to update the constant stored in the constant table to the constant contained in the constant change data.

In the system for changing the constant in the process of the data flow processor by providing a packet containing the constant change data prepared by the data flow process changing system to the data flow processor data, further, the main program may respond to a program initializing packet command from the data flow process changing system to update the constant within the main program to a constant contained in said program initializing packet.

As described, the data flow process changing system can prepare a constant change data at the constant change data generating section when a constant change request is inputted into the data flow process changing system. The destination number selecting means selects a destination number corresponding to the constant change data. The tagging means forms a packet by applying a tag containing the selected destination number to the constant change data.

In the data flow processor, the constant used in the main program being executed is stored in the constant table and updated by the following constant in response to the packet command from the data flow process changing system.

For example, the constant change program may have a constant change value to be used. More particularly, a constant change program having an input node number addressed by the destination number in a packet is executed. The constant is updated when the constant change value of the constant change program is copied in the constant table.

Alternatively, the constant change data contained in the packet may be used. More particularly, the constant change program having an input node number addressed by the destination number in a packet takes out the constant change data contained into the packet. When this constant change data is copied into the constant table, the constant will be updated.

Alternatively, the constant contained in the program initializing packet may be used. More particularly, the constant change data taken out from the program initializing packet is copied into the constant area within the main program to update the constant.

DETAILED DESCRIPTION OF THE PREFERRED EMBODIMENTS

Figure 1:
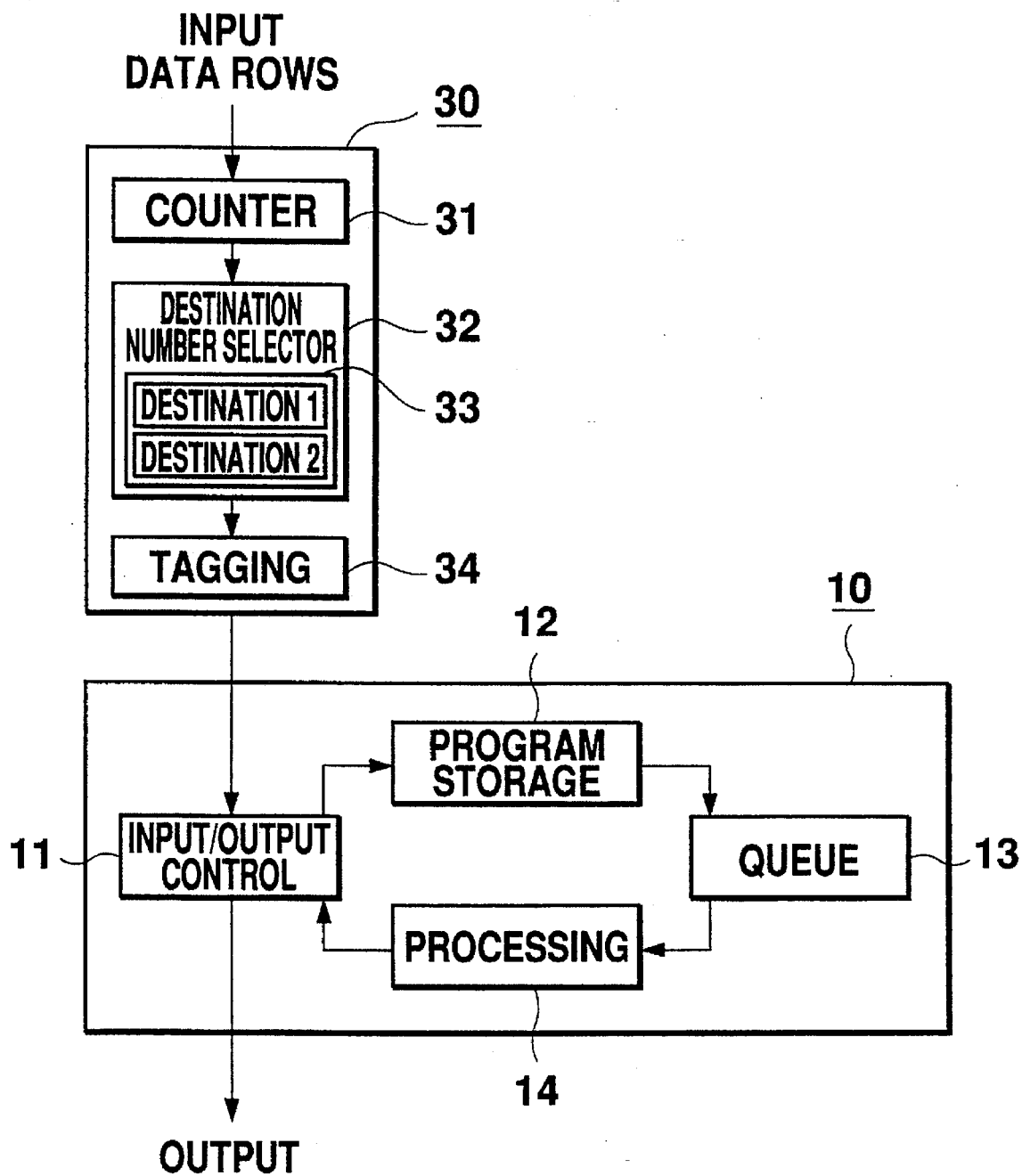
FIG. 1 is a block diagram of one embodiment of a data flow process changing system constructed in accordance with the present invention.

Some preferred embodiments of the present invention will be described with reference to the drawings in which components similar to those of the prior art are designated by similar reference numerals.

FIG. 1 shows a data flow process changing system using a data flow processor which is the first embodiment of the present invention.

The first embodiment is characterized by that, as shown in FIG. 1, the data flow process changing system 30 counts the number of input data rows and selects a destination number corresponding to the count value. In other words, the data flow process changing system 30 performs such a counting as is executed by the data flow processor in the prior art. A destination number corresponding to a program to be executed in the data flow processor 10 is set in a destination number 23 of a packet 20 shown in FIG. 3. When that packet 20 is provided to the data flow processor 10, the process can be changed. This can relieve the load on the data flow processor 10.

In the first embodiment, as shown in FIG. 1, the data flow process changing system 30 is located upstream of the data flow processor 10. Thus, the data flow processor 10 will execute a program when it receives the packet 20 shown in FIG. 3 from the data flow process changing system 30.

Figure 2:
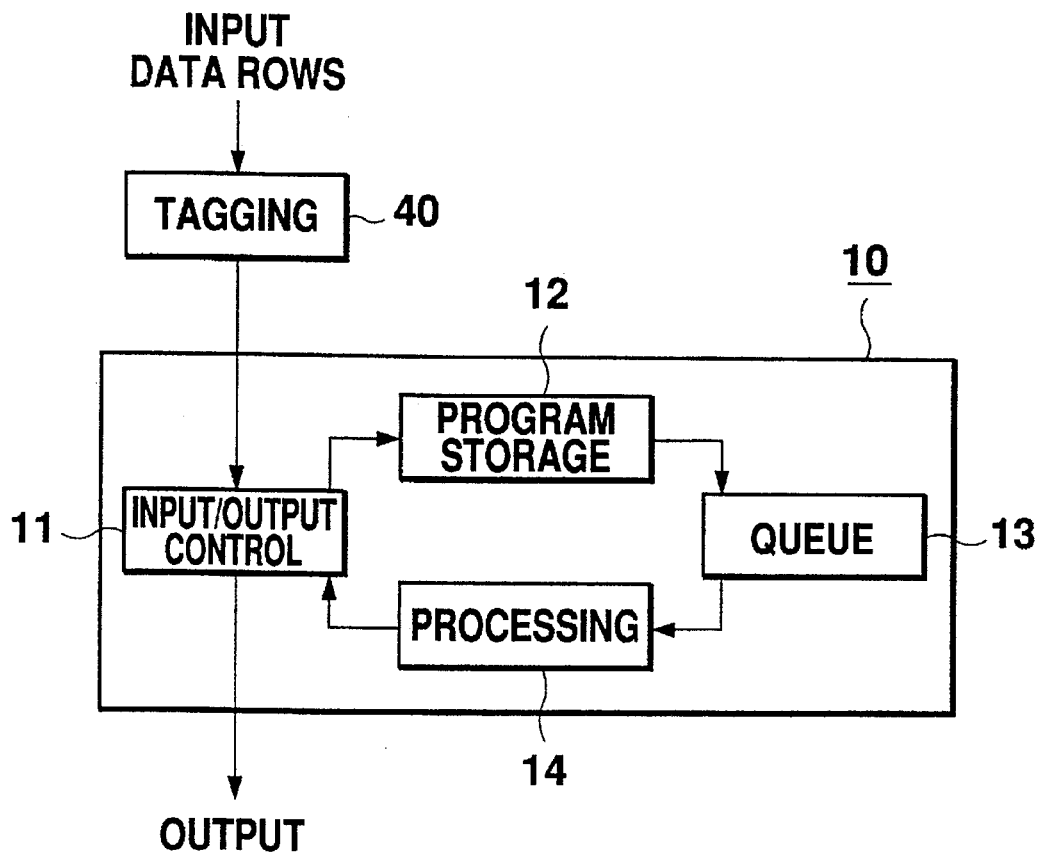
FIG. 2 is a block diagram of a data flow processor constructed in accordance with the prior art.

The data flow process changing system 30 comprises a counter section 31 for counting a series of input data rows sequentially processed by the data flow processor 10, a destination number selecting section 32 for receiving the input data rows and the counted number of input data rows from the counter section 31 to select a destination number corresponding to the counted number of input data rows, and a tagging section 34 for receiving the input data and destination number from the destination number selecting section 32 and for applying a tag to the input data to form a packet 20. The tag 22 contains a destination number 23, command 24 and generation identification number, as in the prior art. The destination number selecting section 32 also has a destination number storage section 33 in which a destination number corresponding to a program to be executed by the data flow processor 10 has been stored. The data flow processor 10 is completely identical with that of the prior art shown in FIG. 2 and will not be further be described herein.

The flow of the process in the first embodiment will be described below. It is also assumed in the first embodiment that input data rows are inputted into the data flow process changing system 30, as in the prior art.

Figure 4:
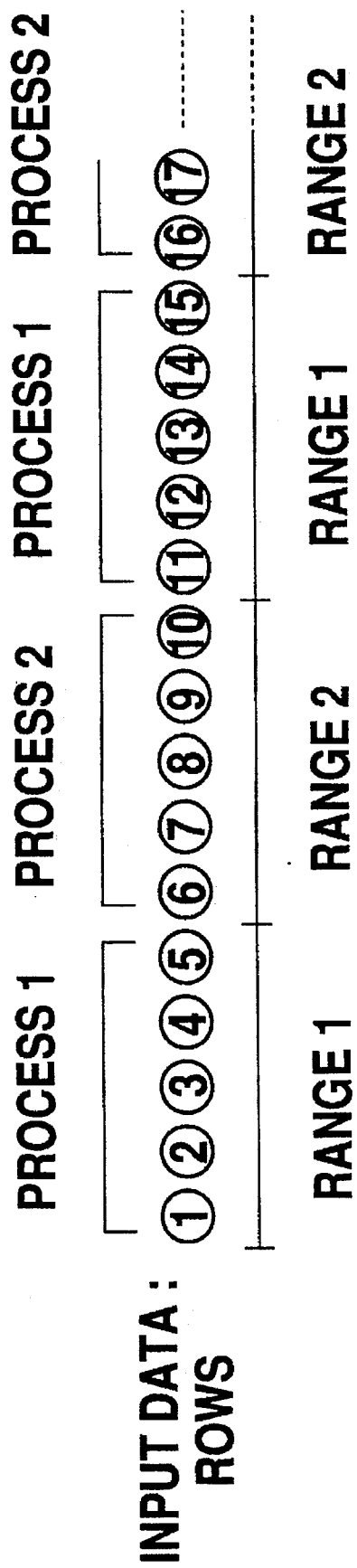
FIG. 4 is a view showing the relationship between the range of input data rows and the process.

In the first embodiment, a series of input data rows ①, ②, ③ and so on as shown in FIG. 4 are inputted into the counter section 31. The counter section 31 counts the input data which in turn are provided to the destination number selecting section 32 with the counted number of input data. The destination number selecting section 32 selects a destination number corresponding to the number of input data. For example, the destination number selecting section 32 selects a destination 1 stored in the destination number storage section 33 if the input data are the first to fifth or eleventh to fifteenth input data contained in the range 1 of FIG. 4 or a destination 2 if the input data are the sixth to tenth or sixteenth and subsequent input data contained in the range 2 of FIG. 4. The selected destination number is sent to the tagging section 34 with the input data themselves. As a result, the tagging section 34 prepares a packet 20.

When the packet 20 having the destination number 23 corresponding to the destination 1 is inputted into the data flow processor 10, a program corresponding to the process 1 at the destination 1 will be executed. Similarly, when the packet 20 having the destination number 23 corresponding to the destination 2 is inputted into the data flow processor 10, a program corresponding to the process 2 at the destination 2 will be executed.

Thus, the process to be executed by the data flow processor 10 can be changed by selecting the destination number. The load on the data flow processor 10 can be relieved since the data flow processor 10 is not required to count the number of packets 20 inputted thereinto with the counts being used to change the process.

Although the first embodiment has been described as to the selection of two destination numbers in the destination number storage section 33, the present invention may be applied to change the process into processes of n in number at the data flow processor 10 by storing destination numbers of n in number from a destination number setting section (not shown) into the destination number storage section 33.

Although the first embodiment has also been described as to each input data row range having five input data, such a range may be set to any extent by the destination number selecting section 32. In other words, the program to be executed by the data flow processor 10 may be changed for each input data row.

Figure 5:
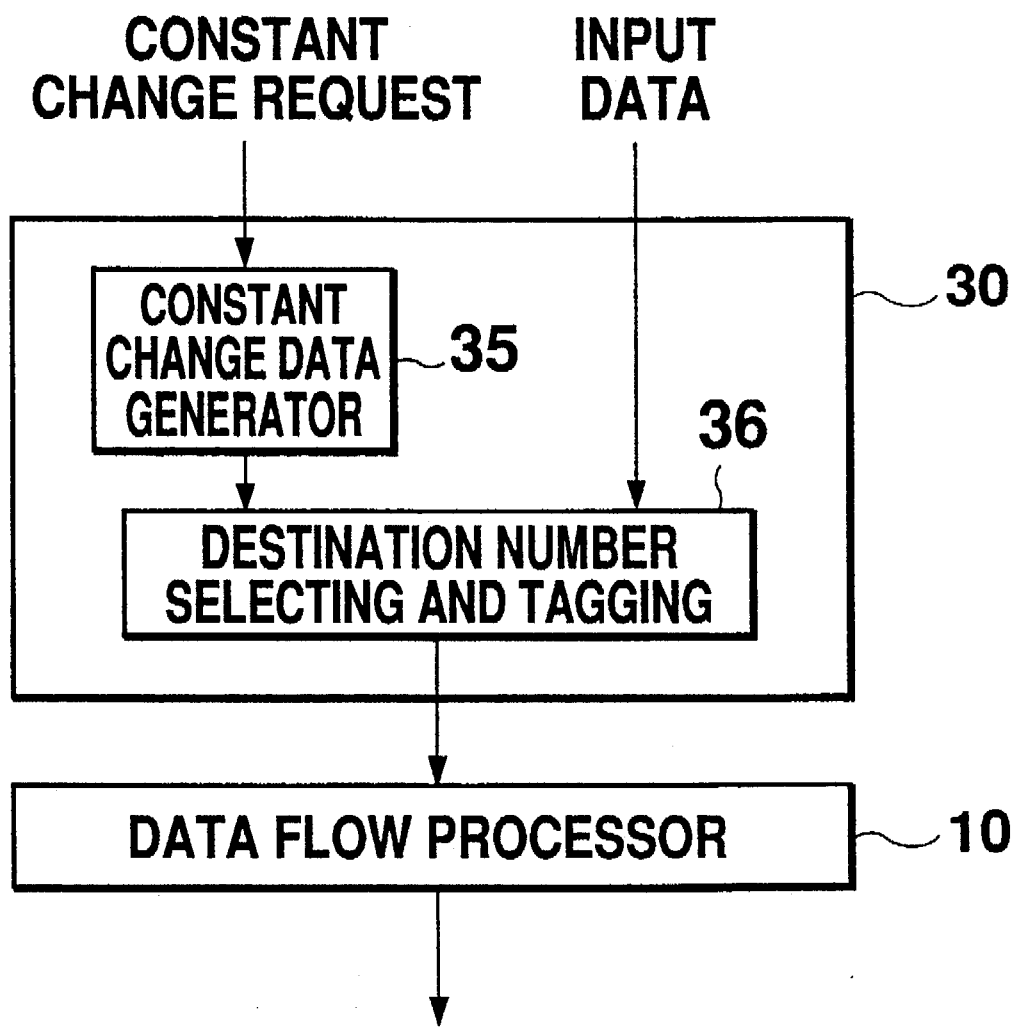
FIG. 5 is a block diagram of one embodiment of a system for changing the constant in the process of the data flow processor constructed in accordance with the present invention.

FIG. 5 shows the data flow processor and a system for changing the process in the data flow processor (hereinafter called "constant changing system"), which are described as the second embodiment of the present invention.

The second embodiment is characterized by that the constant changing system 30 can receive a constant change request, as shown in FIG. 5. Therefore, the constant used in the process of the data flow processor 10 can be changed even when the data flow processor 10 is in operation. More particularly, a program for changing a given constant previously stored in the data flow processor 10 is executed by a constant change request so that the constant used in the main program can be changed even if that main program is being executed by the data flow processor 10. Therefore, the second embodiment does not required discontinuation of the program even if it is necessary to change the constant thereof. This can prevent time loss associated with the process.

Figure 3:
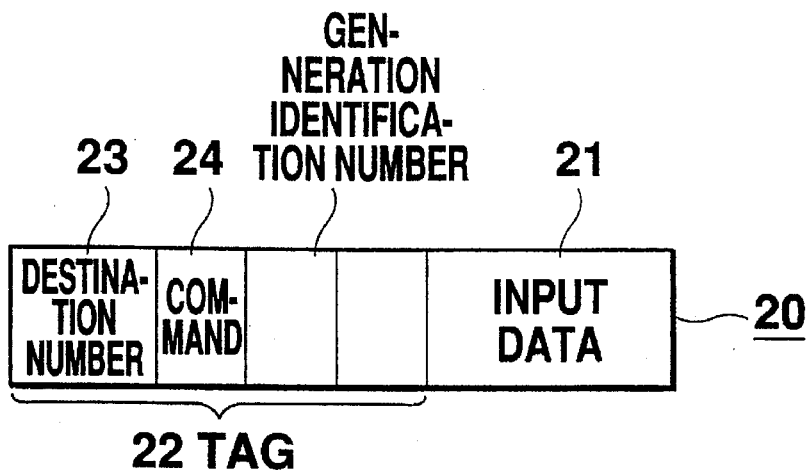
FIG. 3 is a view showing a format of a packet.

In the second embodiment, as shown in FIG. 5, the constant changing system 30 of the present invention is disposed upstream of the data flow processor 10 which executes a program when a packet 20 shown in FIG. 3 is inputted into the data flow processor 10 from the constant changing system 30.

Figure 6:
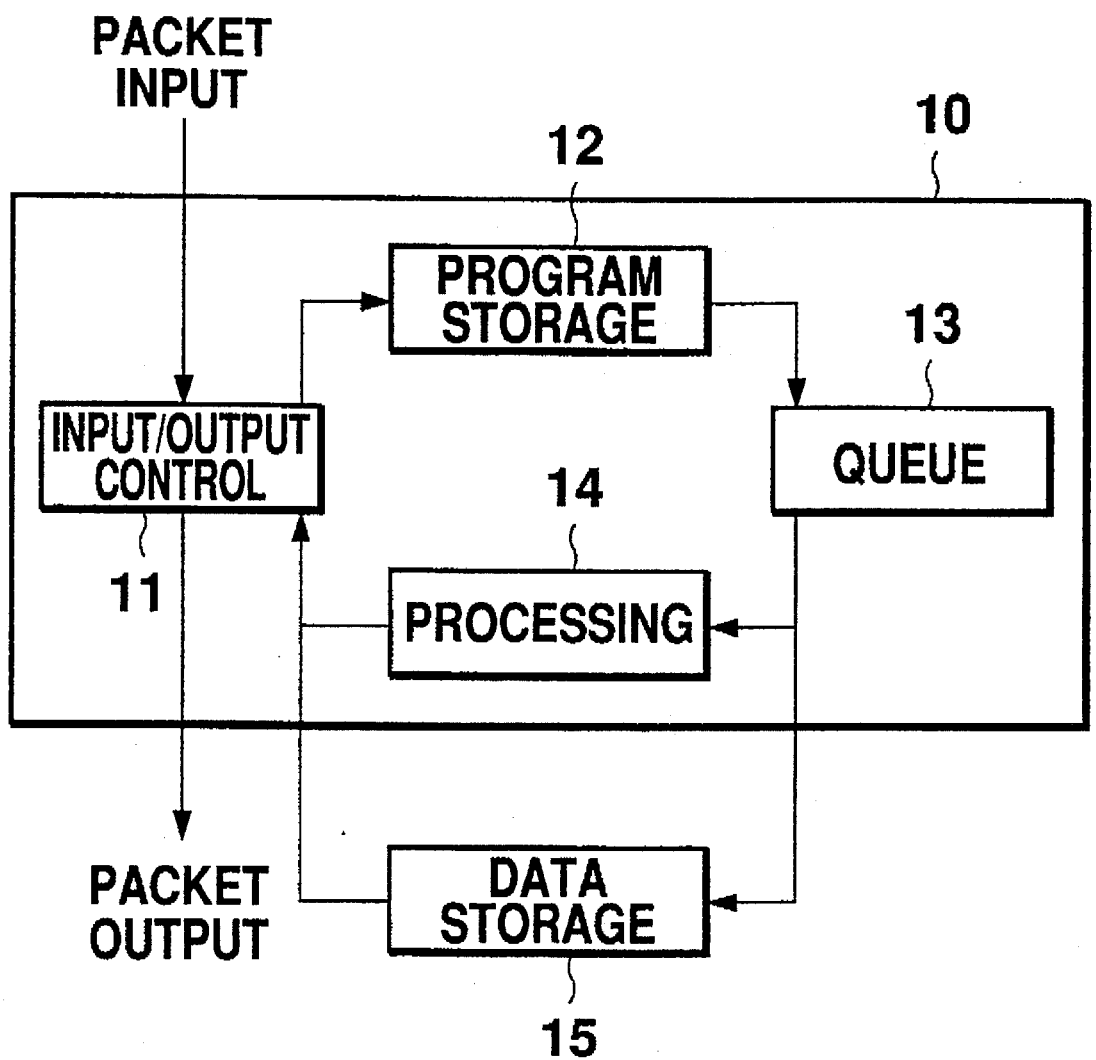
FIG. 6 a block diagram of the arrangement of the data flow processor.
Figure 7:
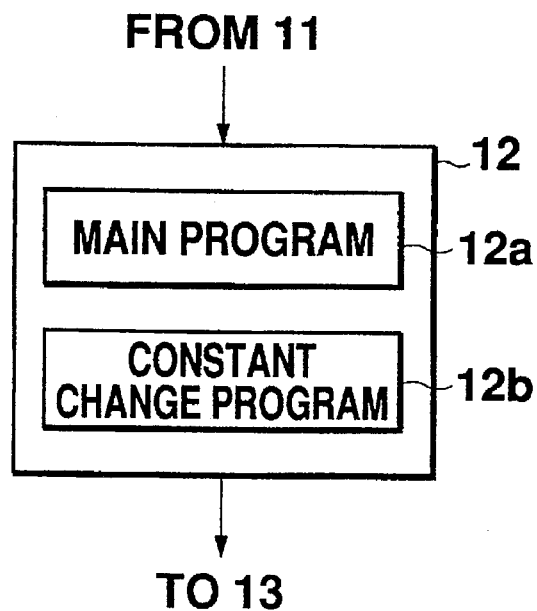
FIG. 7 is a block diagram of the arrangement of the program storage section.
Figure 8:
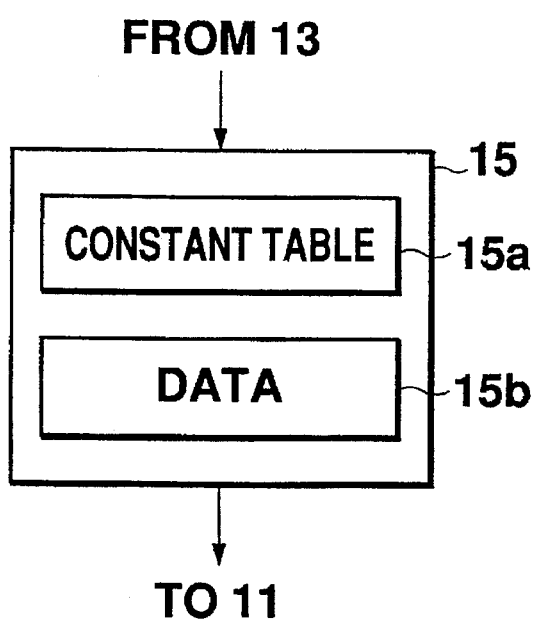
FIG. 8 is a block diagram of the arrangement of the data storage section.

The constant changing system 30 comprises a constant change data generating section 35 for generating a constant change data used to change the constant in the process of the data flow processor 10, and a destination number selecting and tagging section 36 for selecting a destination number corresponding to a series of input data to be sequentially supplied to the data flow processor 10 or the constant change data generated by the constant change data generating section 35 and for applying a tag 22 containing the first-mentioned input data or constant change data at a position of an input data 21 in the packet 20 as shown in FIG. 3 and also containing the selected destination number 23 and command 24 to the input data 21 to form a packet 20. The data flow processor 10 and data storage section 15 are essentially similar to those of the prior art as shown in FIGS. 6 and 8 and will not be further described herein. As shown in FIG. 7, however, the program storage section 12 of the second embodiment comprises a main program area 12a in which previously stored a main processing program and a constant change program area 12b in which is previously stored a constant changing program responsive to a command for updating the constant in a constant table 15a.

The flow of the process for changing the constant of the constant table 15a used in the main program in the second embodiment will be described below.

The second embodiment is characterized by that the constant change program itself has a constant and can respond to a command to update the constant of the constant table 15a to the constant change value possessed by the constant change program.

In the present embodiment, the process of the data flow processor 10 is initiated by starting the main program when a packet 20 having a destination number 23 addressing the input node number of the main program is inputted into the data flow processor 10. At this time, the constant has been set in the constant table 15a. The packet 20 for causing the main program to be executed is formed when the input data is inputted into the constant changing system 30 to cause the destination number selecting and tagging section 36 to store the input node number of the main program (zero in the present embodiment) and the input data at the destination number and input data 21, respectively. In other words, packets 20 are sequentially formed by sequentially supplying the input data to the destination number selecting and tagging section 36. When each of the formed packets 20 is provided to the data flow processor 10, the corresponding process will be executed.

In order to change the constant of the constant table 15a used in the main program, a constant change request is inputted into the constant changing system 30. The constant change data generating section 35 responds to such a constant change request to generate a dummy constant change data. The destination number selecting and tagging section 36 forms the packet 20 by storing the input node number of the constant change program (one in the present embodiment) to be changed into a given constant corresponding to the constant change data in the destination number.

When the data flow processor 10 confirms that the destination number 23 contains one (1), it executes a constant change program having an input node number of one (1). As a result, the constant change program copies its constant change value in the constant table 15a to update the constant used in the main program.

Timing at which the updated constant becomes effective when the packet 20 having the destination number 23 containing one (1) is inputted into the data flow processor 10 is as follows:

For example, input data rows ①, ②, ③, ④, ⑤, ⑥, ⑦ and so on are provided. It is assumed that an input data ⑤ is inputted into the destination number selecting and tagging section 36 and that a constant change request is inputted before another input data ⑥ is can be inputted into the destination number selecting and tagging section 36. It is also assumed that a constant change data d is sent to the destination number selecting and tagging section 36. In such a case, the order of input data 21 contained in the packet 20 inputted into the data flow processor 10 becomes ①, ②, ③, ④, ⑤, d, ⑥, ⑦ and so on. Namely, the constant updated by the constant change program becomes effective from the process for the packets 20 containing the ⑥ and subsequent input data.

Thus, the present embodiment can change the constant used in the processing operation into any constant even when the main program is being executed or when the data flow processor 10 is executing the process. The present embodiment can prevent time loss associated with the process since the program is not discontinued even if it is required to change the constant.

Although the second embodiment has been described in association with a single constant change program, the constant change program area 12b may have stored therein a plurality of constant change programs. In such a case, when the constant change request is inputted into the data flow processor 10, such data as can identify which constant change program is to be executed, for example, an input node number, may be inputted into the data flow processor 10. Thus, the data flow processor 10 can execute a constant change program having its input node number contained in the destination number 23 to update the constant to a predetermined value.

If a single constant change program has a plurality of constant change values in the present invention, one constant change request can simultaneously update a plurality of values in the constant table 15a.

The flow of a process for changing the constant of the constant table 15a used by a main program in the third embodiment will be described below.

The third embodiment is characterized by that a constant to be changed is addressed in a packet 20 for executing the constant change program which responds to the command to update the value of the constant table 15a to the addressed value.

The initiation and operation of the data flow processor 10 are similar to those of the second embodiment and will not be further described herein.

In order to change the constant used in the main program, a constant change request is inputted into the constant changing system 30. At the same time, a constant to be changed is specified. The constant change data generating section 35 forms a constant change data in accordance with the specified constant. The destination number selecting and tagging section 36 stores the input node number (two in the present embodiment) of the constant change program for changing the constant to any constant corresponding to the constant change data in the destination number and also the constant change data in the data 21. Thus, a packet 20 is formed. When the data flow processor 10 confirms that the destination number 23 contains two, the constant change program of the present embodiment having the input node number of two is executed. As a result, the constant change program for changing the constant to any constant takes out a constant to be changed from the data 21. This constant is then copied into the constant table 15a such that the constant used in the main program will be updated.

Thus, the present embodiment can change the constant used in the processing operation even when the main program is being executed or when the data flow processor 10 is executing the process. The present embodiment can prevent time loss associated with the process since the program is not discontinued even if it is necessary to change the constant.

The flow of a process for changing the internal constant of the main program in the fourth embodiment will be described below.

The fourth embodiment is characterized by that the internal constant of the main program is updated to a constant contained in a program initializing packet.

Figure 9:
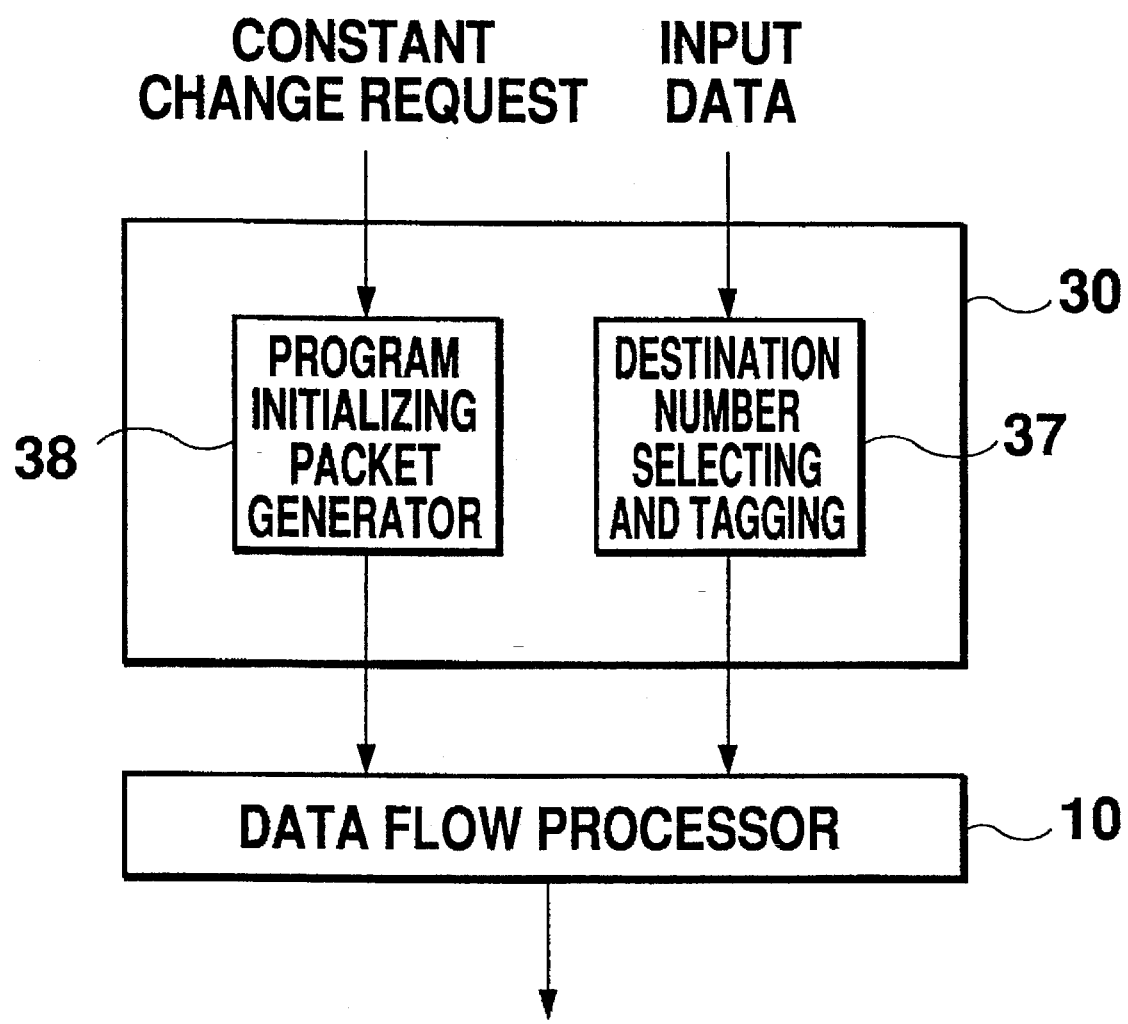
FIG. 9 is a block diagram of the third embodiment of a system for changing the constant in the process of the data flow processor constructed in accordance with the present invention.

FIG. 9 shows the data flow processor 10 and a constant changing system 30 suitable for use in the fourth embodiment. The constant changing system 30 comprises a destination number selecting and tagging section 37 and a program initializing packet generating section 38. The destination number selecting and tagging section 37 selects a destination number corresponding to a series of input data to be sequentially supplied to the data flow processor 10, stores these input data at the position of data 21 in a packet 20 as shown in FIG. 3, and applies a tag 22 including the selected destination number 23 and command 24 to form a packet 20. The program initializing packet generating section 38 generates a constant change data used in the process of the data flow processor 10 to change the internal constant of the main program when the program initializing packet generating section 38 receives a constant change request. The constant change data is then stored in the packet 20 within the data 21 as shown in FIG. 3. The tag 22 containing the destination number 23 of the main program and the command 24 is applied to the data 21 to form a program initializing packet 20.

The initiation and operation of the data flow processor 10 are similar to those of the second embodiment and will not be further described herein.

In order to change (re-initialize) the internal constant of the main program, a constant change request is inputted into the constant changing system 30. The program initializing packet generating section 38 responds to the constant change request to form a program initializing packet 20 by the use of a given initial constant change data. In response to the program initializing packet 20, the data flow processor 10 updates the internal constant of the main program 12a to a constant (initial value) stored in the program initializing packet 20 with the data 21.

Although the fourth embodiment has been described with reference to the program initializing packet generating section 38 containing a predetermined initial value to which the internal constant of the main program 12a is to be updated, the program initializing packet generating section 38 may have a plurality of program initializing packets 20 having different constant change data. When the program initializing packet generating section 38 receives a constant change request, it may specify which program initializing packet 20 should be provided to the data flow processor 10.

Thus, the present embodiment can re-initialize the internal constant of the program used in the processing operation into any constant even when the main program is being executed or when the data flow processor 10 is executing the process. The present embodiment can prevent time loss associated with the process since the program is not discontinued even if it is necessary to change the constant.

Although three embodiments of the present invention have been described in association with the respective constant change programs for changing the constant in the process of the data flow processor, these constant change programs may be combined depending on the capacity of the program storage section 12.

In accordance with the present invention, as described, the data flow process changing system selects a destination number corresponding to the counted number of input data to change the process in the data flow processor. Therefore, the load on the data flow processor can be relieved to reduce time required to execute the process.

Furthermore, the present invention provides the constant changing system for forming a packet containing a constant change data corresponding to a constant change request. When the packet is provided to the data flow processor, the constant used in the process can be changed even when the data flow processor is in the middle of the process.

Accordingly, time loss associated with change of the constant can be avoided. Namely, time loss associated with the process of the data flow processor can be prevented.

What is claimed is:

1. Data processing apparatus comprising:

a data flow process changing system comprising destination number storage means storing a plurality of different destination numbers, data input means for receiving successive input data units, counter means connected for counting, and assigning a successive count number to, each successive input data unit received by said data input means, with each count number being associated with a selected destination number, means for combining each received input data unit with a respective one of the plurality of destination numbers to form a respective packet, said means for combining being controlled by the count number assigned to each input data unit for combining each input data unit with the selected destination number which is associated with the assigned count number, and output means for outputting each packet, and a data flow processor comprising packet input means connected to said output means for receiving each packet, a program storage section storing a plurality of programs, each program corresponding to a respective one of the destination numbers stored in said destination number storage means, and a processing section connected to receive the data unit in each packet received by said packet input means and to process the received data unit in each packet under control of that one of the stored programs which corresponds to the destination number in the same packet.

2. Data processing apparatus comprising:

a data flow process changing system comprising destination number storage means storing a plurality of different destination numbers, data input means for receiving successive input data units, counter means connected for counting, and assigning a successive count number to, each successive input data unit received by said data input means, with each count number being associated with a selected destination number, means for combining each received input data unit with a respective one of the plurality of destination numbers to form a respective packet, said means for combining being controlled by the count number assigned to each input data unit for combining each input data unit with the selected destination number which is associated with the assigned count number, and output means for outputting each packet, and a data flow processor comprising packet input means connected to said output means for receiving each packet, a program storage section storing a plurality of programs, the programs including a main program which executes a process utilizing a constant, and a constant change program which executes a process for updating the constant utilized in the process executed by the main program, each program corresponding to a respective one of the destination numbers stored in said destination number storage means, and a processing section connected to receive the data unit in each packet received by said packet input means and to process the received data unit in each packet under control of that one of the stored programs which corresponds to the destination number in the same packet.

3. Apparatus as defined in claim 2 further comprising a data storage section connected to said data flow processor and containing a constant table in which is stored the constant utilized in the process executed by the main program, and wherein the constant change program is executable in response to a packet applied to said packet input means for updating the constant stored in the constant table.

4. Apparatus as defined in claim 2 wherein said data flow process changing system further comprises:

constant change data generating means responsive to a constant change request for generating a constant change data unit to change the constant utilized in the process executed by the main program;

destination number selecting means for selecting a destination number corresponding to a plurality of successive input data units, and a destination number corresponding to the constant change data unit; and tagging means for applying a tag containing the respective selected destination number to each of the data units to form respective packets;

whereby when a packet is supplied to said data flow processor, the program corresponding to the selected destination number is executed and a packet containing the constant change data unit provides a command for updating the constant to said data flow processor.

5. Apparatus as defined in claim 4 wherein the constant change program contains a predetermined constant change value, and said data flow processor comprises means for replacing the constant stored in said constant table with the constant change value in response to the command in the packet which contains the constant change data unit.

6. Apparatus as defined in claim 4 wherein the constant change data unit contains data representing a constant, and the constant change program is responsive to the command in the packet which contains the constant change data unit for replacing the constant stored in the constant table with the constant represented by data contained in the constant data change unit.

7. Apparatus as defined in claim 3 wherein said data flow process changing system further comprises: second input means for receiving a constant change request signal which contains data representing a constant; and program initializing packet generating means connected to said second input means and operative for generating, in response to receipt of a constant change request signal, a program initializing packet containing the data representing a constant, and further wherein the main program is operative in response to receipt of the program initializing packet at said packet input means for updating the constant utilized in the process executed by the main program to the constant represented by the data contained in the program initializing packet.

* * * * *